May 4, 1965 J. W. CUTTER 3,181,649
PORTABLE TOWER CONSTRUCTION
Filed Dec. 23, 1963 6 Sheets-Sheet 4

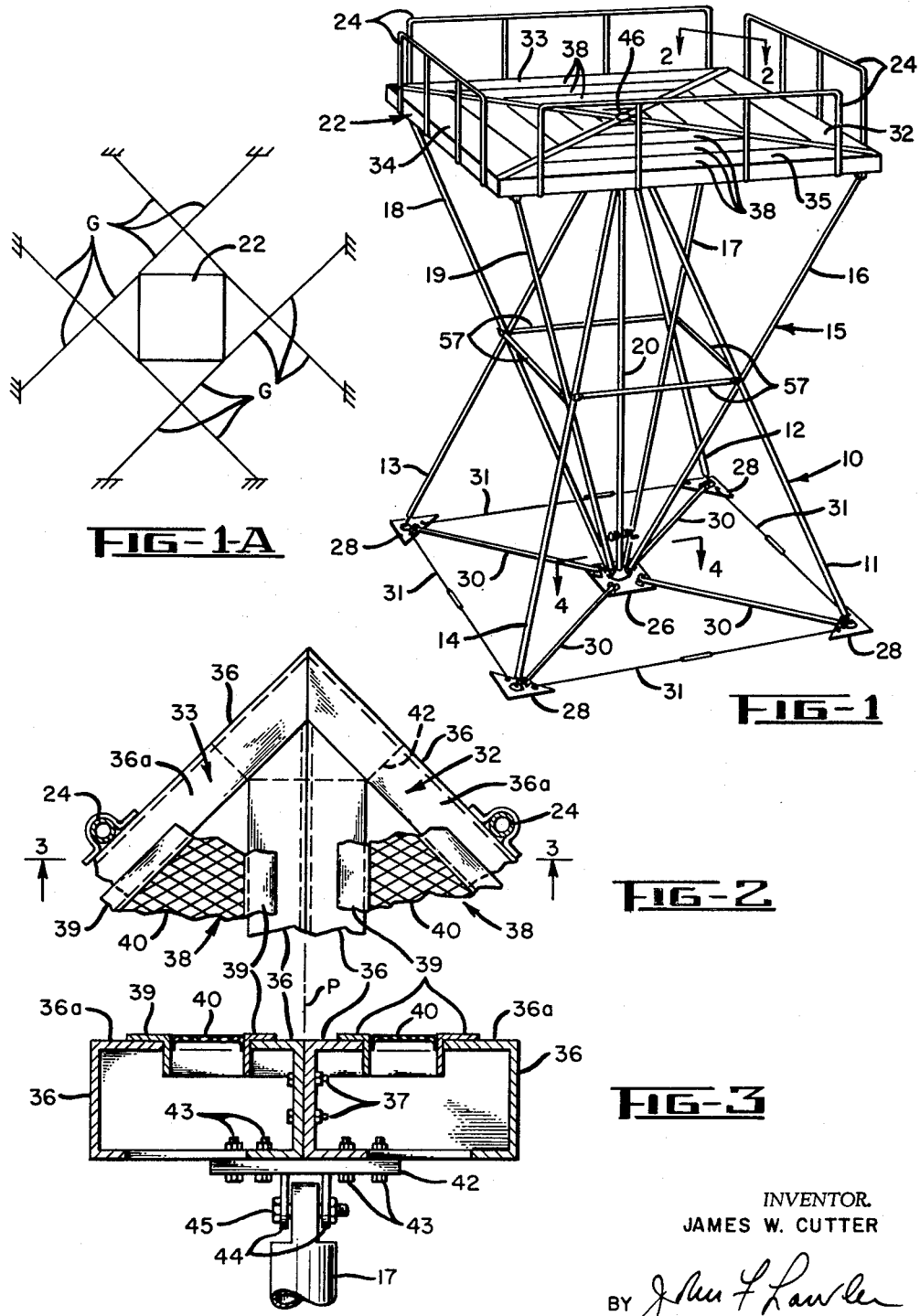

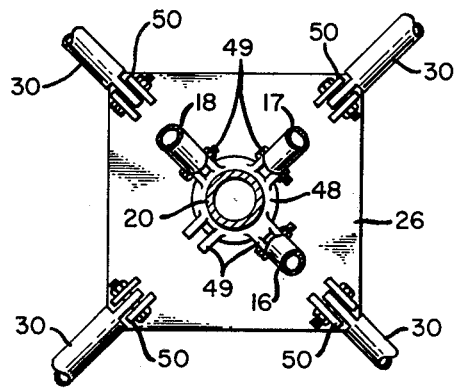
FIG-4
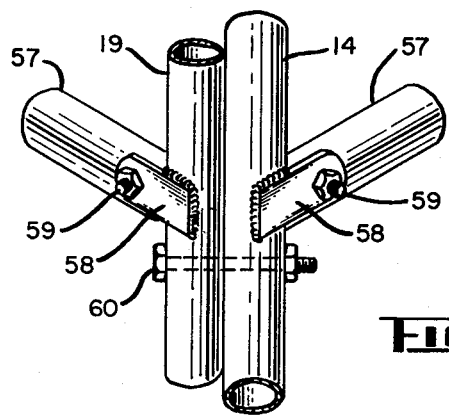
FIG-5
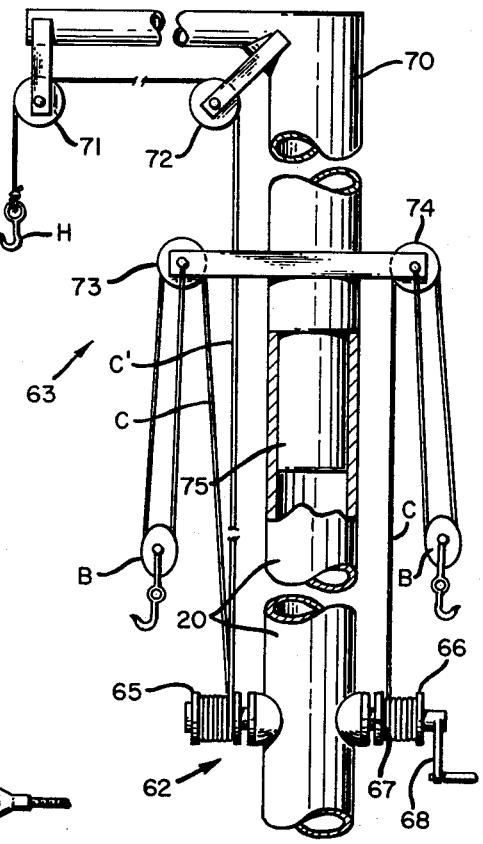
FIG-8
FIG-6
INVENTOR.
JAMES W. CUTTER
BY *John F. Lawler*
ATTORNEY

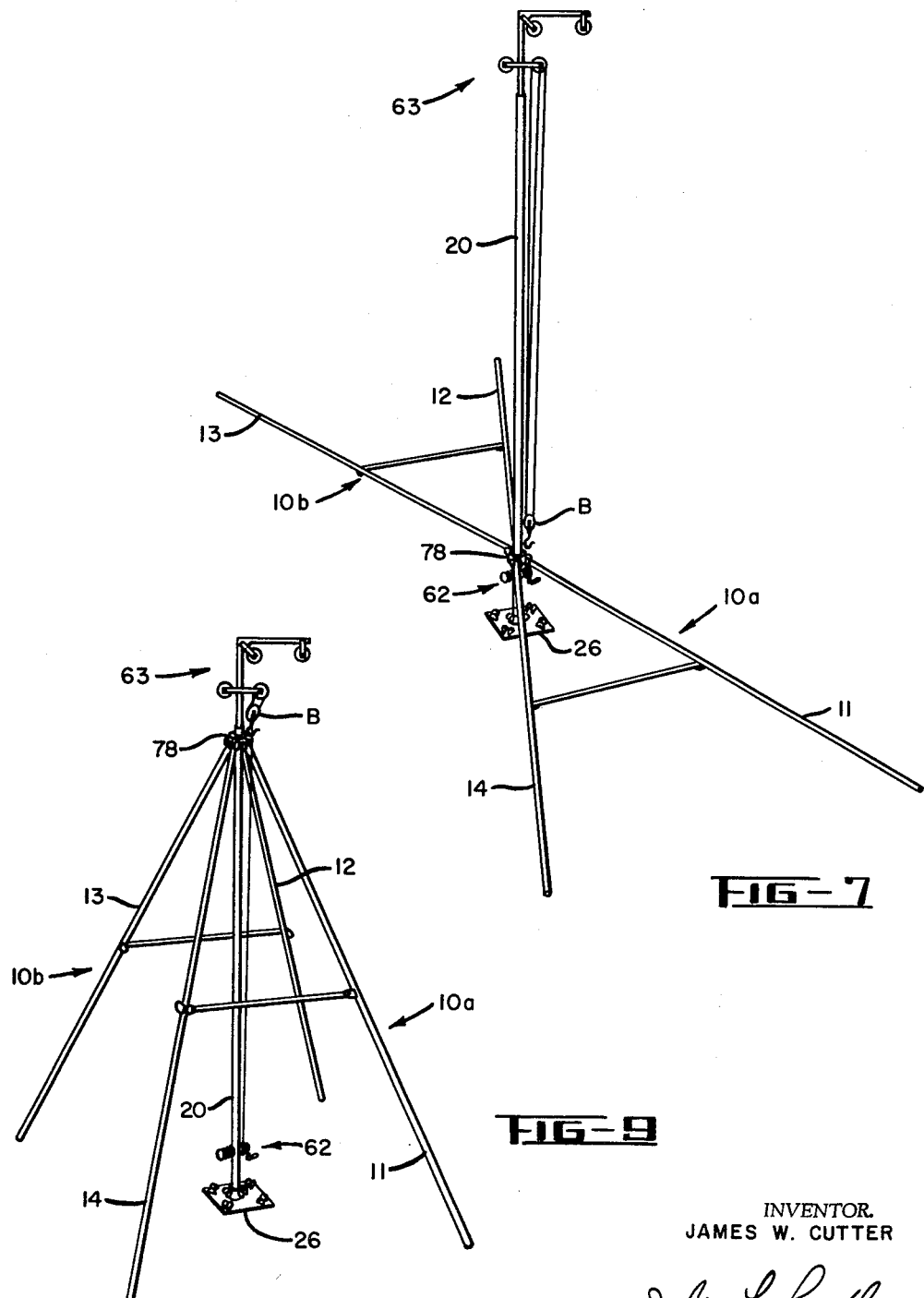

INVENTOR.
JAMES W. CUTTER
BY John F. Lawler
ATTORNEY

United States Patent Office 3,181,649
Patented May 4, 1965

3,181,649
PORTABLE TOWER CONSTRUCTION
James W. Cutter, Los Altos, Calif., assignor to Sylvania Electric Products Inc., a corporation of Delaware
Filed Dec. 23, 1963, Ser. No. 332,736
10 Claims. (Cl. 182—152)

This invention relates to towers and more particularly to an improved portable tower construction.

Relay stations for microwave communication links and the like often require towers to support the equipment in elevated positions in the field. Because of the remoteness and inaccessibility of many field sites, there is difficulty in transporting material and equipment for erection of the towers at those sites. While the problem is somewhat alleviated by use of prefabricated towers that may be disassembled for shipment, there remains the difficulty of providing the necessary hoisting equipment at the site for raising the tower sections in place. The bulk and weight of derricks or cranes generally used for erecting towers greater than 20 feet in height limit their utility to the more accessible sites.

An object of this invention is the provision of a highly portable field tower that is capable of erection without special hoisting equipment.

Another object is the provision of a tower that may be erected quickly and with a minimum of labor and without special tools.

A further object is the provision of a low cost lightweight sturdy field tower.

In accordance with the invention, the tower comprises two coaxial pyramidal frames arranged about a center column with one of the frames inverted relative to the other. Each pyramidal frame is made of lightweight preferably tubular elements and comprises a pair of A-frames secured to the center column. Simple lightweight hoisting equipment detachably connected to the center column serves to pivotally lift the A-frames into position. The elevated platform at the top of the tower lies in the base plane of the inverted pyramidal frame and comprises four sections having removable flooring. The separate structural elements comprising the tower may be compactly stored for transportation to and from remote construction sites.

These and other objects of the invention will become apparent from the following description of a preferred embodiment thereof; reference being had to the accompanying drawings in which:

FIGURE 1 is a perspective view of a tower embodying the invention;

FIGURE 1A is a schematic plan view of the tower secured by guy wires;

FIGURE 2 is a plan view of a corner portion of the elevated platform;

FIGURE 3 is a section taken on line 3—3 of FIGURE 2;

FIGURE 4 is a transverse section of the lower central part of the tower frame taken on line 4—4 of FIGURE 1;

FIGURE 5 is an elevation of one of the corner base plates of the tower showing its connection to diagonal and horizontal support members and the ball and socket connection to one of the pyramidal frame members;

FIGURE 6 is a perspective view of the junction of adjacent pyramidal frame side members and braces intermediate the base and top of the tower;

FIGURE 7 is a perspective view of the center column, hoisting mechanism and pair of A-frames during the initial stages of erection of the tower;

FIGURE 8 is an enlarged fragmentary elevation of the center column showing details of the hoisting mechanism;

FIGURE 9 is similar to FIGURE 7 and shows one pair of A-frames in the upright position;

Figure 10:
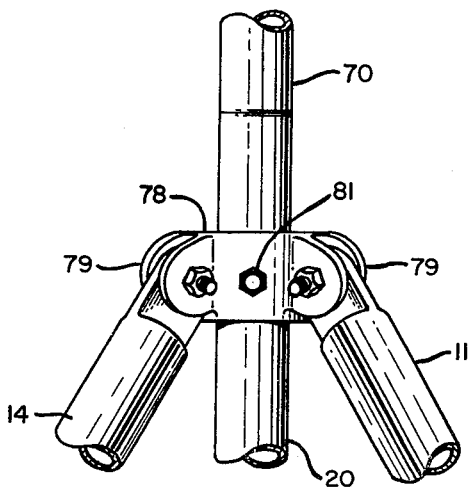
FIGURE 10 is an enlarged elevation of the connection of the A-frame members to the central column in FIGURE 9.

Referring now to the drawings, a tower embodying the invention is shown in FIGURE 1 and comprises a first pyramidal frame 10 having side members 11, 12, 13 and 14, and a second pyramidal frame 15 having side members 16, 17, 18 and 19. The pyramidal frames 10 and 15 are arranged coaxially of a central column 20 and are inverted with respect to each other so that the base plane of frame 10 is on a supporting surface such as the ground and the base plane of frame 15 is at the top of the tower. A platform 22 is supported on column 20 and frame 15 in the plane of the base of the latter. Guard rails 24 are secured to and extend up from the sides of platform 22.

The side members of frame 15 and center column 20 are secured to a center base plate 26 which rests on the ground. The lower ends of the side members of frame 10 are supported on corner plates 28 rigidly secured to center plate 26 by diagonal interconnecting rods 30 and to each other by tension rods 31.

In order to securely anchor the tower when subjected to the force of high winds and the like, guy wires G, see FIGURE 1A, may be secured between the ground and the corners of the platform in the crossed pattern illustrated.

Platform 22 comprises four pie-shaped sections 32, 33, 34 and 35. Each section has three U-shaped structural members 36 (see FIGURES 2 and 3) connected together as legs of a triangle when viewed in plan, and adjacent members 36 of adjacent floor sections are secured together by bolts 37. The floor of each platform section preferably comprises a series of interconnected removable strips 38 having angle shaped side frames 39 to which floor screening 40 is secured and which in turn are supported on flanges 36a of the section frame members. Alternatively, the platform sections may be prefabricated with the floors permanently connected to the section framing.

Each of the frame side members 16, 17, 18 and 19 is connected at its upper end to a clevis plate 42, see FIGURE 2, which overlaps the outer juxtaposed corner portions of adjacent floor sections and is secured thereto by bolts 43. Each clevis plate 42 has a clevis connector 44 pivotally connected by bolt 45 to the end of the frame member. It should be noted that the connector 44 preferably is symmetrically disposed about the junction plane P of the floor sections to which the clevis plate is connected in order that the supporting side member (illustrated as member 17 in FIGURE 3) may provide balanced support of the outer corners of adjacent floor sections.

The floor sections are connected together at the center of the platform by a coupling plate 46, see FIGURE 1, which overlays and is bolted to the sections. Additionally floor sections 32 and 34 are connected directly to the center column 20 as will be explained below.

The lower end of center column 20 is secured to base plate 26 and carries a yoke 48, see FIGURE 4, having four clevis connectors 49 spaced 90 degrees apart and to which the side members of pyramidal frame 15 are pivotally connected. Each of the outer corners of base plate 26 also has a clevis connector 50 to which each of the diagonal members 30 is removably coupled.

Each corner plate 28 is formed with a socket 51, see FIGURE 5, for receiving a ball-shaped adjustable member 52 having a threaded stem 53 for connection to the lower end of associated side member (shown as member 14) of frame 10. In addition to having a clevis connector 54 for coupling to diagonal member 30, the corner plate also has a pair of pins 55 on which eyes 56 on the ends of tension rods 31 are anchored.

The side members of pyramidal frames 10 and 15 are reinforced midway between their ends and the frames are connected together by transverse braces 57 (see FIGURES 1 and 6). Each brace is removably secured at each end to one of the side members by means of a lug 58 brazed to the member and connected by bolt 59 to the brace. Adjacent members of pyramidal frames 10 and 15 are suitably coupled together at their crossover points, for example, as illustrated in FIGURE 6 wherein frame members 14 and 19 are secured together by bolt 60.

The structural members which comprise the tower preferably are lightweight so that tubing is used for the center column, side members and braces. It will be noted also that substantially all of the interconnecting parts are removably connected together to facilitate disassembly of the tower into component packages of convenient size and weight for transportation. The eight side members comprising pyramidal frames 10 and 15 are substantially identical as are the braces 57, diagonal members 30 and corner plates 28, thereby enabling economical mass fabrication of tower parts with consequent low tower cost. The light weight of the open framework construction and the pivotal connections of the side members to their center column 20 and to platform 22 enable the tower to be erected with minimum effort and with lightweight hoisting equipment as will be better understood from the description below. Towers made in accordance with the invention are suitable for platform heights of 25 feet or more above the ground.

An important feature of this tower construction is the speed and convenience with which it may be erected. This is illustrated in FIGURES 7–13, inclusive. Erection is begun with center column 20 provided with hoisting equipment mounted thereon as shown in FIGURE 8. Center column 20 may be made of two or more telescoping sections for convenience in storage and transportation. The hoisting equipment consists of a lower winch assembly 62 secured to the center column at waist height (three to four feet from the bottom of the pole) and a sheave support assembly 63 mounted at the top of the column. Winch assembly 62 comprises a pair of winches 65 and 66 mounted on opposite sides of the column on a common shaft 67 which is journaled on the column and to which a crank 68 is connected. Each of the winches carries suitable cable C for the hoisting operation; a third cable C' being connectable to winch 65 to operate an alternate hoist. Sheave support assembly 63 comprises an inverted L-shaped arm 70 supporting single sheaves 71 and 72 and double sheaves 73 and 74. The lower part of arm 70 rests on the top column 20 and a plug 75 secured to the former extends into the upper portion of column 20 to secure the arm thereto for pivotal movement about the axis of column 20. Cables C extend from winches 65 and 66, respectively, through double sheaves 73 and 74 and connect to hoisting blocks B. The alternate cable C' extends through single sheaves 72 and 71 for connection to a lifting hook H.

Center column 20 with winch assembly 62 and sheave support 63 mounted thereon and with yoke 48 secured to its lower end is raised to an upright position on center plate 26 as shown in FIGURE 7. The hoist cables preferably are engaged with the respective sheaves but for the sake of clarity certain of the cables are omitted from the drawings. An upper yoke 78, shown in the elevated position in FIGURE 10, is slidably mounted on the center column directly above winch assembly 62 either by assemblying it on the column or by predisposing it thereon prior to erection of the column. Yoke 78 has four clevises equally angularly spaced thereon, two of which are shown at 79 in FIGURE 10. The two side members of each of the two A-frames 10a and 10b are pivotally connected to clevises 79 on yoke 78 as shown in FIGURE 7. By means of one of the cables C and blocks B, yoke 78 is lifted to the top of column 20 and the A-frames 10a and 10b assume the position shown in FIGURE 9. Yoke 78 is secured in this upper position shown in FIGURE 10 by a bolt 81 which extends through the yoke and column. Column 20 extends above yoke 78 sufficiently to permit sections of the platform to be clamped thereto.

Figure 11:
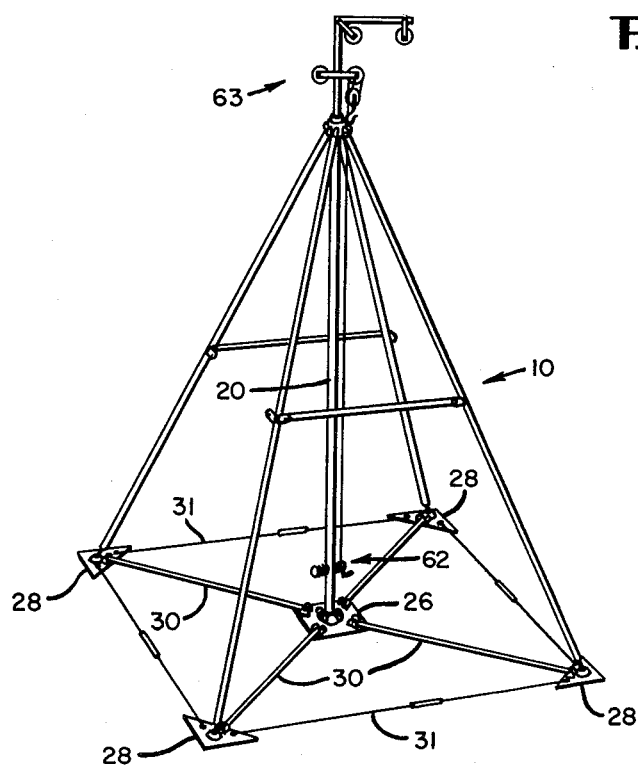
FIGURES 11, 12 and 13 show the tower in successive later stages of erection.

Corner plates 28 are placed under the side members of the A-frames after the adjustable ball members 52 have been inserted in the latter, thereby making a ball and socket connection between these parts. Diagonal members 30 and tension rods 31 complete the connection of the corner plates 28 to center plate 26 and to themselves as shown in FIGURE 11. The assembly of pyramidal frame 10 is then complete.

Figure 12:
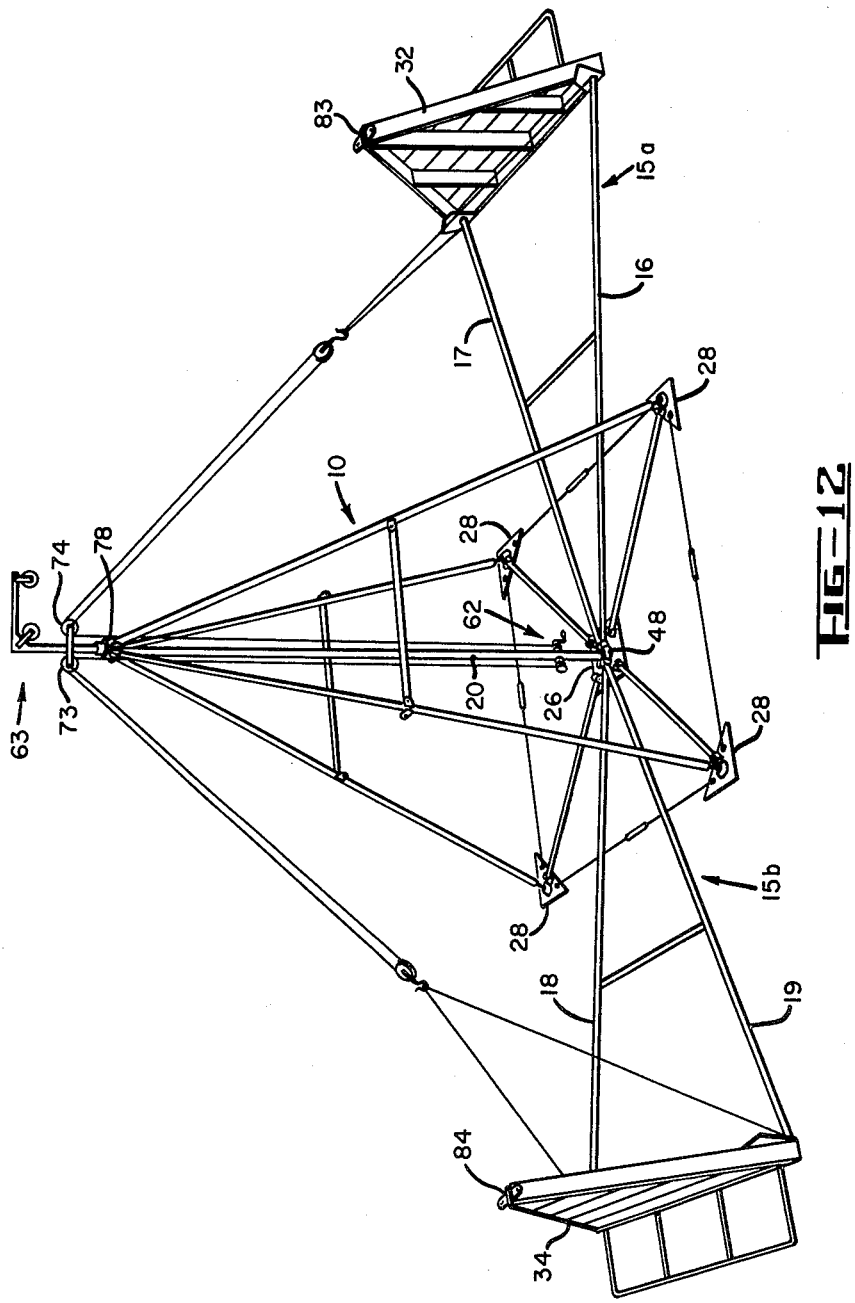

The side members of A-frames 15a and 15b, see FIGURE 12, of pyramidal frame 15 are connected at their divergent ends to clevis plates 42 on platform sections 32 and 34, respectively, and are connected at their opposite ends to yoke 48 at the bottom of column 20. Clevis plates 42 are bolted to the corners of platform sections 32 and 34 and project outwardly therefrom for ultimate connections to floor sections 33 and 35 added later. The hoisting mechanism utilizing both winches 65 and 66, double sheaves 73 and 74, and blocks B, is connected as shown in FIGURE 12 to the upper parts of the A-frames 15a and 15b and the latter are pivoted upwardly about base plate 26 until the inner ends of floor sections 32 and 34 abut the top of the center column 20 immediately above yoke 78. The inner ends of floor sections 32 and 34 are provided with clamps 83 and 84 which are bolted together around column 20 to secure frame 15 and these floor sections in place.

Figure 13:
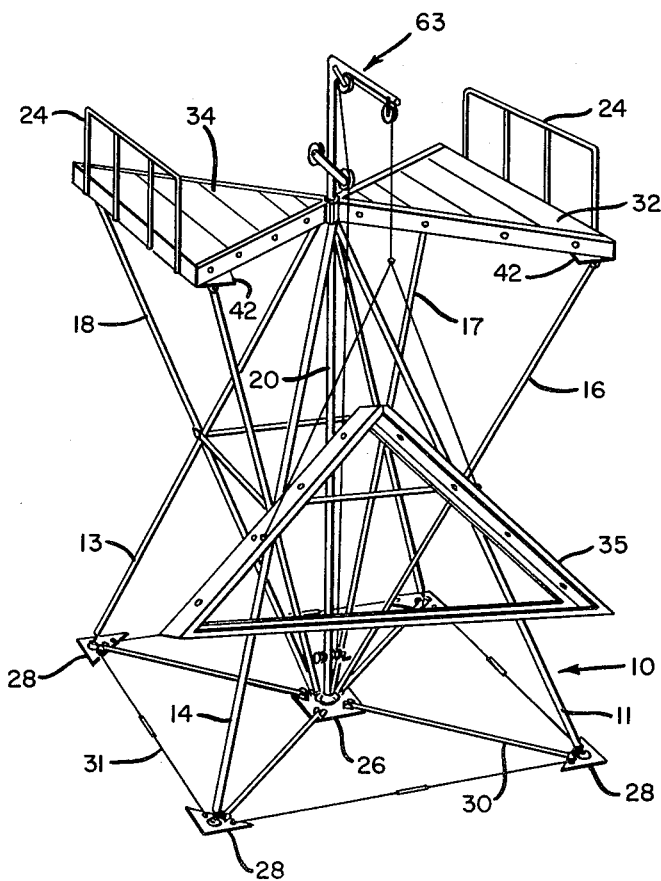

The remaining floor sections 33 and 35 are lifted, preferably one at a time, see FIGURE 13, by the hoisting mechanism to the plane of the platform, each section is bolted to clevis plates 42 and to adjacent platform sections, and the floor strips 38 are added to complete the platform. Thereafter sheave support assembly 63 and cables are removed and clamp plate 45 is secured to the four floor sections at the center of the platform to complete the structure.

Changes, modifications and improvements may be made to the above-described tower without departing from the spirit and scope of the invention. The appended claims describe the invention consistent with the advance it has made to the art.

I claim:

1. A collapsible tower adapted to support objects at elevated positions above a supporting surface comprising
   a first frame having side members supported by said surface and covering toward each other from a plane containing the ends of the members in a vertical direction,
   a second frame having side members supported by the surface within said first frame and diverging from said plane and from each other in a vertical direction, and
   a platform supported by said frames at an elevated position above the surface, said platform comprising a plurality of sections detachably connected to each other and to said frames.

2. A collapsible tower having a vertical axis and adapted to support objects at elevated positions above a surface comprising
   a first coaxial frame having side members supported by the surface and converging toward each other from a plane containing the end of the members and toward said axis in a vertical direction,
   a second coaxial frame having side members supported by the surface within said first frame and diverging from said plane and from each other in a vertical direction and, a platform supported by said frames at an elevated position above the surface, said platform comprising a plurality of similar sections detachably connected to each other and to said frames.

3. a collapsible tower having a vertical axis and adapted to support objects at elevated positions above a surface comprising
a first coaxial frame having side members supported on the surface and converging toward each other and toward said axis in a vertical direction,
a second coaxial frame having side members supported on the surface within said first frame and diverging from each other in a vertical direction,
a platform supported by said frames at an elevated position above the surface, said platform comprising a plurality of similar sections detachably connected to each other and to said frames, and
first coaxial means adjacent to said platform pivotally connected to the side members of said first frame and second coaxial means adjacent to said surface pivotally connected to the side members of second frame.

4. A collapsible tower adapted to be supported on a surface and having a vertical axis comprising
a coaxial column,
a first pyramidal frame having coaxially arranged side members supported by the surface and converging from a plane containing the ends of the members in a vertical direction to a connection with said column at a predetermined distance about the surface,
a second pyramidal frame having coaxially arranged side members connected to said column at the intersection of the latter with said plane and diverging from said plane and from each other in a vertical direction,
means of detachably connecting adjacent members of the first and second frames intermediate the surface and said predetermined distance thereabove, and
a platform at said predetermined distance above the surface, comprising
a plurality of substantially identical sections arranged symmetrically about said axis and detachably connected together,
each section being connected to a pair of side members of the second pyramidal frame and to said central column.

5. A collapsible tower adapted to support objects at an elevated position above a surface comprising
a vertical column supported on the surface,
a first pyramidal frame having four side members supported by the surface at positions substantially spaced from said column and from each other and converging in a vertical direction toward each other from a plane containing the ends of the members to a connection with said column at a predetermined height above the surface,
rigid means connecting each of said side members to said column at said plane,
a second pyramidal frame having four side members connected to said column at said plane and diverging from said plane and from each other in the vertical direction,
means for interconnecting adjacent side members of said first and second frames, respectively, intermediately of the surface and the elevated position, and
a rectangular platform at said elevated position comprising four substantially identical triangularly-shaped sections connected at their inner corners to said column above the side members of the first pyramidal frame, each of said sections being supported at its outer corners on two of the side members of the second pyramidal frame.

6. A collapsible tower comprising
a center column supported on and projecting vertically from a supporting surface,
a first pair of A-frames on opposite sides of the column pivotally connected at the convergent ends thereof to the column remote from the suppotring surface,
said frames being supported at their divergent ends on said surface with the plane of each frame forming a downwardly opening angle with the column,
a second pair of A-frames on opposite sides of said column with the convergent ends thereof pivotally connected to the column adjacent to the supporting surface, the plane of each frame of said second pair of frames extending transversely of the planes of the first pair of frames,
a platform, and
means for connecting said platform to the divergent ends of the second pair of frames and to the center column directly above the connection to the latter of the first pair of frames.

7. A tower adapted to support objects at a predetermined height above a supporting surface comprising
a center plate on said surface,
a center column engaging said plate and extending vertically therefrom,
four corner plates on said supporting surface equally spaced from and rigidly secured to said center plate,
a first pyramidal frame having two pairs of side members engaging said corner plates, respectively, said members converging toward each other and toward the column in a vertical direction,
an upper yoke releasably secured to said column substantially at said predetermined height above the surface,
means for pivotally connecting said side members to said yoke,
a transverse brace interconnecting the side members of each of said pairs of members at substantially one-half of said predetermined height above said surface,
a lower yoke secured to said column adjacent to the center plate,
a second pyramidal frame having two pairs of side members pivotally connected to said second yoke, the last named members diverging from each other and from the column in a vertical direction,
a transverse brace interconnecting the side members of each pair of members in the second pyramidal frame at substantially one-half of said predetermined height above said surface,
means for releasably connecting each pair of adjacent side members of the first and second frames, respectively, adjacent to said braces, and
a platform extending transversely of the column at said predetermined height above the surface, said platform comprising
four triangular shaped sections releasably secured together, each section being secured at one corner thereof to the column above said upper yoke and being secured at the remaining corners thereof to two of the side members, respectively, of the second pyramidal frame.

8. The tower according to claim 7 in which each corner plate is formed with a socket,
each of said side members of the first pyramidal frame having a ball member adjustably secured at the lower end thereof and engageable in the socket of the associated corner plate.

9. The method of erecting a vertical platform tower on a supporting surface consisting of the steps of
removably connecting hoisting apparatus to one end of an elongated column,
supporting the column vertically on said surface with the hoisting equipment at the top thereof,
disposing a first pair of converging support frames on opposite sides of the bottom of the column and pivotally and slidably connecting the convergent ends thereof to the column, hoisting the convergent ends of said frames to a predetermined height above the surface and locking the frames to the column whereby the planes of the frames diverge from the column to the supporting surface, disposing a second pair of converging support frames on opposite sides of the column between the first pair of frames and pivotally connecting the convergent ends of the former to the lower end of the column, each frame of the second pair of frames having a platform section connected to the divergent end thereof and projecting transversely upwardly of the plane thereof, pivotally hoisting the second pair of frames about the lower end of the column until the platform sections engage the column directly above the first pair of frames whereby the planes of the second pair of frames converge from the sections to the lower end of the column, clamping the platform sections to the column, hoisting two similar platform sections to said predetermined height above the surface and connecting the same to opposite sides of the other platform sections, and removing the hoisting equipment from the top of the column.

10. The method of erecting a vertical platform tower on a supporting surface consisting of the steps of supporting an elongated column vertically on said surface, pivotally and slidably connecting the ends of a first pair of support frames to opposite sides of the column, hoisting the connected ends of said frames to a predetermined height above the surface and locking the frames to the column, pivotally connecting the ends of a second pair of support frames to the lower end of the column, each frame of the second pair of frames having a platform section connected to the end remote from the column and projecting transversely upwardly of the plane thereof, pivoting the second pair of frames about the lower end of the column until the platform sections engage the column directly above the first pair of frames, clamping the platform sections to the column, and connecting other similar platform sections to said first named platform sections.

References Cited by the Examiner

UNITED STATES PATENTS

| | | | |
|---|---|---|---|
| 967,803 | 8/10 | Mercer | 182—179 X |
| 1,119,631 | 12/14 | Osenburgh | 189—12 X |
| 1,231,823 | 7/17 | Weasler | 189—187 X |

HARRISON R. MOSELEY, *Primary Examiner.*

REINALDO P. MACHADO, CHARLES E. O'CONNELL, *Examiners.*